United States Patent [19]

Venkatesan et al.

[11] Patent Number: 4,544,461

[45] Date of Patent: Oct. 1, 1985

[54] HYDROGEN SULFIDE DECOMPOSITION CELL AND CATALYTIC MATERIALS THEREFOR

[75] Inventors: Srinivasan Venkatesan, Royal Oak; Naum Pinsky; Krishna Sapru, both of Troy, all of Mich.

[73] Assignee: Energy Conversion Devices, Inc., Troy, Mich.

[21] Appl. No.: 479,476

[22] Filed: Mar. 28, 1983

[51] Int. Cl.[4] .................... C25B 1/00; C25B 11/00
[52] U.S. Cl. .................... 204/128; 204/252; 204/256; 204/284; 204/290 R; 204/290 F; 204/294
[58] Field of Search .......... 204/128, 130, 136, 190 R, 204/190 F, 252, 256, 284, 294

[56] References Cited

U.S. PATENT DOCUMENTS

| | | | |
|---|---|---|---|
| 3,401,101 | 9/1968 | Keller | 204/136 |
| 3,409,520 | 11/1968 | Bolmer | 204/101 |
| 4,220,505 | 9/1980 | Deem | 204/136 |
| 4,275,126 | 6/1981 | Bergmann | 204/192 SP |
| 4,328,080 | 5/1982 | Harris | 204/192 SP |
| 4,392,927 | 7/1983 | Fabian | 204/290 R |

*Primary Examiner*—John F. Niebling
*Attorney, Agent, or Firm*—Lawrence G. Norris

[57] ABSTRACT

A catalytic material for electrochemically oxidizing hydrogen sulfide or another sulfur containing gas is provided to accomplish decomposition of the gas. The catalytic materials can be incorporated in an anode for use in a electrolytic cell for removing sulfur from a contaminated useful gas to produce useful sulfur products. The catalytic materials also can be incorporated in an anode for a fuel cell wherein hydrogen sulfide or other sulfur containing gas is utilized as the fuel which is oxidized at the anode to produce electrical energy. The catalytic materials of the present invention are of a disordered multicomponent material which includes at least one element selected from the group consisting of transition elements and at least one modifying element selected from the group consisting of sulfur and oxygen. The host matrix and substrate can also include a carbon containing composition.

12 Claims, 3 Drawing Figures

HYDROGEN SULFIDE DECOMPOSITION CELL AND CATALYTIC MATERIALS THEREFOR

FIELD OF THE INVENTION

This application relates to cells for the electrolytic decomposition of hydrogen sulfide and the use of hydrogen sulfide as a fuel in a fuel cell, and more particularly this invention relates to improved catalytic materials for the anodes of such cells.

THE PRIOR ART BACKGROUND

Hydrogen sulfide is environmentally undesirable and thus its decomposition is desired or required in many instances. Hydrogen sulfide pollution and other problems caused thereby are of significant concern to many energy related industries such as crude oil refining, coal gasification, and the supplying of natural gas and geothermal energy.

There are various prior art methods for hydrogen sulfide ($H_2S$) disposal. The oil refining industry, for example, uses a method known as the Claus process. In this process, $H_2S$ is burned yielding sulfur dioxide and water. The sulfur dioxide in turn is further reacted with $H_2S$ to yield sulfur, water and heat. The reactions are highly exothermic and this heat can be utilized to generate high grade process steam for hydrocracking, another step in the oil refining process. The equipment and processing plant necessary for practicing the Claus method of $H_2S$ decomposition however, represents a very large capital investment. Therefore, except for a process such as oil refining where a use for the heat generated by the Claus process is present, the capital investment can not be economically justified. Other disadvantages of the Claus process are that its hydrogen sulfide conversion efficiency is only about 92 percent and other pollutants such as $CS_2$ and COS are normally also produced by the Claus process. Thus, for many applications, $H_2S$ decomposition by the Claus method is not a practical solution.

Hydrogen sulfide contamination perhaps presents the most troublesome problems for suppliers and users of natural gas. Natural gas burns more efficiently and with less pollutants after removal of hydrogen sulfide. Also, hydrogen sulfide is quite corrosive and its inclusion in natural gas corrodes pipelines used for transporting the gas and can poison the catalyst of the burners of the devices in which the natural gas is ultimately utilized. Poisoning occurs when the active sites of the catalyst become inactivated by poisonous species resulting from the $H_2S$ impurities contained in the natural gas. Once such active sites become inactivated, they are no longer available to act as a catalyst for the desired reaction resulting in decreased conversion efficiencies.

One prior art hydrogen sulfide removal process which has been proposed for decontaminating a hydrocarbon gas, such as natural gas, is disclosed in U.S. Pat. No. 3,409,520. The patent discloses an electrolysis cell having an electrolyte therein and an anode and a cathode in contact with the electrolyte with the electrodes being connected to an external source of electric power. The hydrogen sulfide-hydrocarbon gas mixture is introduced into the electrolysis cell and into contact with the anode which preferably is constructed of a porous carbon material impregnated with a catalyst such as platinum. In operation, an externally generated electric current is passed through the electrolyte between the anode and the cathode in order to electrolytically oxidize sulfide ions at the anode to form a sulfur oxidation product of the sulfide ions which may be free sulfur, certain polysulfides, or both. At the same time, hydrogen ions are electrolytically reduced to form free hydrogen at the cathode. The sulfur product and hydrogen gas are separately withdrawn from the electrolysis cell and disposed of as desired. The hydrocarbon gas is also withdrawn separately from the cell yielding an at least partially decontaminated gas.

Other methods of decomposing hydrogen sulfide are disclosed in U.S. Pat. Nos. 4,314,983, 3,994,790, 3,266,941, 3,249,522, and 4,320,180. The last two noted patents operate not only to decompose $H_2S$, but in so doing produce electricity. U.S. Pat. No. 3,249,522 operates as a fuel cell employing anodic oxidation of hydrogen sulfide and cathodic reduction of oxygen or air. The fuel cell of that invention operates in a similar manner to a conventional fuel cell wherein hydrogen is utilized as the oxidant and reacts with the electrolyte's hydroxyl ions in the presence of the anode catalyst to form water and release electrons. With $H_2S$ utilized as a fuel, sulfide ions are oxidized at the anode releasing electrons: $S^{2-} \rightarrow S^O + 2e^-$. The sulfur produced reacts with other sulfide ions to form disulfide and polysulfide ions: $S^O + S^{2-} \rightarrow S_2^{2-}$. The anode materials disclosed by the patent include carbon which can have impregnated or disposed thereon conventional fuel cell catalysts such as one or more metals of Groups Ib, Vb, VIb and VIII of the periodic table. One problem with this fuel cell is that when free sulfur is formed as an anodic product, the finely divided precipitate of sulfur can enter the pores of the porous gas diffusion anode and inactivate it causing an increase in the anode polarization and an increase in the resistnce across the anode-electrolytic interface thereby reducing the electrical output.

One attempt to overcome this problem in a fuel cell utilizing $H_2S$ is proposed in U.S. Pat. No. 4,320,180. Therein is disclosed a fuel cell, in which a redox couple is used as the negative electrolyte which is oxidized at the fuel cell anode and then subjected to reduction outside the electrolytic cell by reaction with $H_2S$ in a remotely located reaction column. The sulfur formed in the reaction column is removed from the electrolyte before the reduced electrolyte is recirculated back into the fuel cell. Consequently, the sulfur is prevented from inactivating the platinum or Raney nickel anode catalyst of the fuel cell.

One drawback of the electrolytic $H_2S$ decomposition and fuel cell devices of the prior art, concerns the particular materials utilized for the anode catalyst. Often proposed for such use are noble metal containing materials, such as platinum, because of their high catalytic efficiency. Such metals, however, are not only quite expensive, but also are very susceptible to poisoning, reducing their commercial acceptability. The poisoned catalyst will not purify the contaminated hydrogen sulfide gas to the extent required, consume a greater amount of energy to remove a like amount of contaminants, and in the case of noble metal catalysts is quite expensive to replace.

Other drawbacks of the prior art anode catalysts result from the fact that they are generally based upon a crystalline structure. In a crystalline structure the catalytically active sites which provide the catalytic effect of such materials result primarily from accidently occurring, surface irregularities which interrupt the periodicity of the crystalline lattice. A few examples of such surface irregularities are dislocation sites, crystal steps, surface impurities and foreign adsorbates. A major problem with a crystalline structure is that the number of such irregularities forming the catalytically active sites are relatively few and occur only on the surface of the crystalline lattice. This results in the catalytic material having a density of catalytically active sites which is relatively low. Thus, the catalytic efficiency of the material and the device in which it is utilized is substantially less than that which would be possible if a greater number of catalytically active sites were available for the hydrogen sulfide decomposition or other desired reaction.

Thus, high catalytic efficiency from a relatively low cost material which is resistant to poisoning and stable in the $H_2S$ cell environment, remain as desired results which must be attained before there will be widescale commercial utilization of devices of the type to which this invention relates.

SUMMARY OF THE INVENTION

In accordance with the present invention the disadvantages of the prior art are overcome by providing disordered multicomponent catalytic materials which can be tailor-made to exhibit optimum catalytic activity for hydrogen sulfide decomposition. An electrode including the catalytic materials of the present invention can be adapted to be utilized for direct or indirect electrolysis of hydrogen sulfide to remove the same from a contaminated fluid. The electrode of the present invention can also be utilized for anodic oxidation of hydrogen sulfide to produce electric power in a fuel cell. The catalytic materials provided by the present invention have a high density of active sites and have improved catalytic activity in comparison to prior art materials proposed for such uses. The increased catalytic activity of the materials of the present invention serves to increase operating efficiencies to thereby reduce operating costs and result in more complete removal of hydrogen sulfide contaminants. The catalytic materials are also resistant to poisoning primarily due to their increased density of catalytically active sites and can provide a stable performance over a long period of time.

The catalytic materials of the present invention are formed from a wide range of compositions and desired structural configurations so as to exhibit optimum catalytic activity for the hydrogen sulfide decomposition reaction. Tailoring of the local structural and chemical order of the materials of the present invention is of great importance to achieve the desired characteristics. Amorphous materials having only short range order can be utilized as can crystalline materials having long range order, but where the structure is deliberately modified to increase the density of catalytically active sites above that obtainable in the prior art.

The improved catalytic activity of the present invention is accomplished by manipulating the local chemical order and hence the local structural order by the incorporation of selected modifier elements into a host matrix to create the desired disordered material. The desired multicomponent disordered material can be amorphous, polycrystalline (but lacking long range compositional order), or microcrystalline in structure or an intimate mixture of any combination of these structures.

The catalytic materials of the present invention include at least one element forming a host matrix and at least one modifier element intimately incorporated into the host matrix. The element or elements forming the host matrix include at least one transition element. The host matrix or substrate can also be formed from or with carbon. The modifier elements include at least sulfur or oxygen to form an oxide, sulfide or oxy sulfide of the transition metal or metals of the host matrix. The incorporation of the modifier element or elements acts to disorder the structure of the material and to create local structural chemical environments which are capable of acting as catalytically active sites for the hydrogen sulfide decomposition reaction. The utilization of a disordered structure allows the creation of an increased density and a wide spectrum of catalytically active sites to yield materials which operate at high catalytic efficiency and are more resistant to poisoning and corrosion.

An electrode utilizing the catalytic material of the invention can be formed by a variety of methods. For example, the catalytic material can be deposited by vacuum deposition, chemical deposition or electrochemical deposition techniques as a thin film on suitable conductive electrode substrates. The catalytic materials can be formed on a porous gas diffusion type substrate or on a flat surface type substrate. The catalytic materials can also be formed in bulk quantities and thereafter fabricated to form a porous or flat electrode without the use of a substrate.

Hydrogen sulfide decomposition in accordance with one aspect of the present invention, utilizes an electrolysis cell having an electrolyte therein, and an anode and a cathode which are in contact with the electrolyte and connected to an external power source. The catalytic material of the present invention is incorporated in the anode and the hydrogen sulfide gas or hydrogen sulfide gas mixture, such as natural gas contaminated with hydrogen sulfide, is introduced into the cell in contact with the electrolyte and anode catalyst where the $H_2S$ is electrolytically decomposed to form sulfur. The natural gas or other selected gas to be decontaminated, is withdrawn from the cell in a purified form.

In another aspect of operation of the invention, the hydrogen sulfide is decomposed indirectly by electrolysis. In indirect electrolysis a redox-couple is included in the electrolyte and oxidized at the anode and then pumped to a remote reaction column where the redox-couple is reduced by reaction with a gas containing hydrogen sulfide to remove the hydrogen sulfide therefrom. The resulting sulfur from the reaction column is filtered from the electrolyte before it is returned to the electrolysis cell. In a continuous manner the redox-couple is oxidized at the anode and then returned to the reaction column for further decomposition of $H_2S$. Since in the indirect method, $H^2S$ is decomposed in the reaction column and not inside the electrolysis cell, the possibility of poisoning the cell anode with $S_2^-$ ions is avoided.

In the indirect electrolysis process, along with the redox couple oxidation the other electrode produces hydrogen. The cost of the operation is thus decreased since hydrogen is a useful byproduct. Also, the process is a relatively low voltage process and at least part of the necessary electrical power can be provided by a photovoltaic power source. This provides an added advantage for use in remote locations, because the $H_2S$ can be removed at the place of formation.

The electrodes of the present invention also can be used for the anode of a fuel cell wherein $H_2S$ is used as the fuel which is oxidized at the anode to produce electric power. As a result of the high catalytic efficiency of the catalytic materials of the present invention and their resistance to poisoning by the sulfur formed by the anode reaction, hydrogen sulfide waste gas can be converted into useful electrical energy. Both the indirect and direct electrolysis methods provide highly efficient hydrogen sulfide decomposition and can be accomplished with relatively compact equipment at low capital cost.

DETAILED DESCRIPTION OF THE PREFERRED EMBODIMENTS

Figure 1:
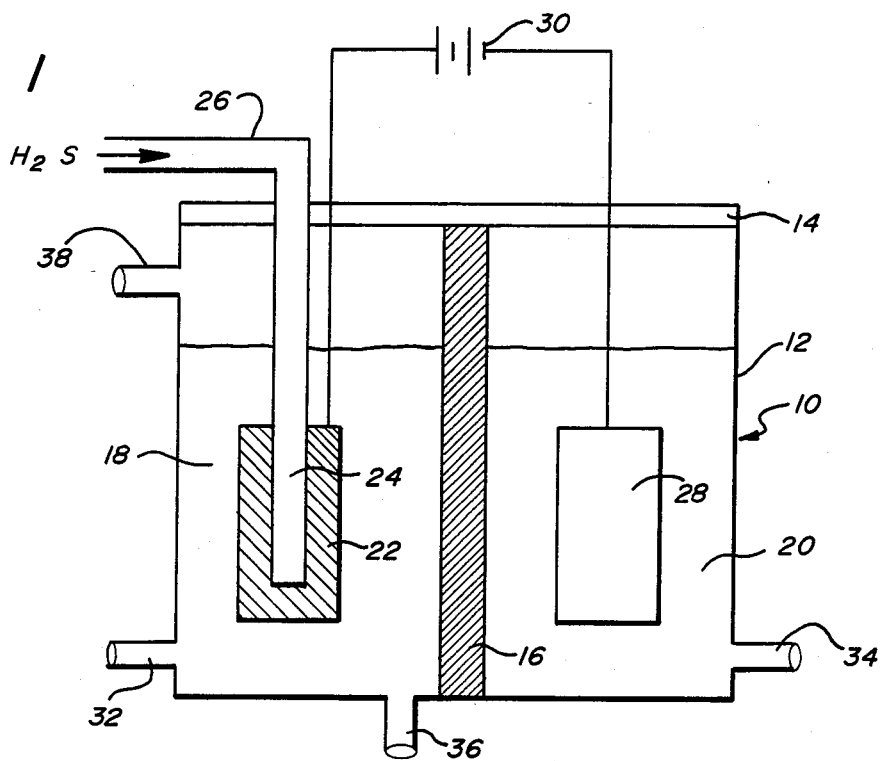
FIG. 1 is a diagrammatic view of a cell for direct electrolysis of hydrogen sulfide.

The present invention provides multicomponent materials having tailor-made local structural chemical environments which are designed to yield excellent catalytic characteristics for the electrochemical oxidation of hydrogen sulfide. The manipulation of local structural chemical environments to provide catalytically active sites is made possible by utilization of a host matrix having at least one transition element or which can, in accordance with the present invention, be structurally modified by the incorporation of at least sulfur and/or oxygen to create a greatly increased density of catalytically active sites for the hydrogen sulfide oxidation reaction in an electrolytic cell. With a greater density of catalytically active sites the desired decomposition reaction occurs much more readily to thereby lower operating costs and provide greater removal of $H_2S$ from contaminated fluids.

The increased numbers of catalytically active sites also enables the materials to be more resistant to poisoning. This is because with materials of the present invention a certain number of catalytically active sites can be sacrificed to the effects of poisonous species while a large number of unpoisoned sites still remain to provide the desired reaction.

The disordered materials of the present invention, unlike the specific and rigid structure of crystalline materials, are ideally suited for manipulation since they are not constrained by the symmetry of a crystalline lattice or by stoichiometry. By utilizing materials which do not have restrictive crystalline symmetry, it is possible to accomplish a significant alteration of the local structural chemical environments involved in hydrogen sulfide decomposition to enhance the catalytic properties of the materials. The disordered materials of the present invention can be modified in a substantially continuous range of varying percentages of modifier elements. This ability allows the host matrix to be manipulated by the modifier elements to tailor-make or engineer materials with characteristics suitable for the hydrogen sulfide decomposition. This is in contrast to crystalline materials which generally have a very limited range of stoichiometry available and thus a continuous range of control of chemical and structural modification of such crystalline materials is not possible.

In the disordered materials of the present invention, it is possible to attain unusual electronic configurations resulting from nearest neighbor interactions between lone pairs, microvoids, dangling bonds, and unfilled or vacant orbitals. These unusual electronic configurations can interact with the modifier elements of the present invention which are incorporated into the host matrix to readily modify the local structural chemical order and thus the electronic configurations of the matrix to provide numerous catalytically active sites for hydrogen sulfide decomposition.

The disorder of the modified material can be of an atomic nature in the form of compositional or configurational disorder provided throughout the bulk of the material or in numerous regions of the materials. The disorder can also be introduced into the material by creating microscopic phases within the material which mimic the compositional or configurational disorder at the atomic level by virtue of the relationship of one phase to another. For example, the disordered materials can be created by introducing microscopic regions of a different kind or kinds of crystalline phases, or introducing regions of an amorphous phase or phases in addition to regions of a crystalline phase of phases. The interfaces between these various phases can provide surfaces which are rich in local chemical environments providing numerous catalytically active sites.

A major advantage of the disordered materials is that they can be tailor-made to provide a very high density of active catalytic sites relative to materials based upon a crystalline structure. The types of structures which provide the local structural chemical environments for improved catalytic efficiency in accordance with the present invention include multicomponent polycrystalline materials lacking long range compositional order, microcrystalline materials, amorphous materials having one or more phases, or multiphase materials containing both amorphous and crystalline phases or mixtures thereof.

The anodes of the present invention can be fabricated by a variety of methods, but generally can be described as having an electrode substrate with an outer surface which has a thin film of catalytic material deposited or formed thereon. Carbon, cobalt, nickel, copper, titanium, conducting carbides and sulfides and other suitable conductors are examples of materials which can be used in forming the substrates. The catalytic material includes at least one transition element which is formed as, deposited as, or converted to include a sulfide, oxide, or oxy-sulfide of the transition metal. (The host matrix or substrate can also be formed from or with carbon.) Lead can also be included and the preferred catalytic materials include CoS, CuS, $MoS_2$, $WS_2$, PbS, $RuO_2$ and $TiO_2$. The electrodes can take the form of any conventionally used electrode configuration, such as cylindrical, flat, mesh, etc., and can also be of the gas diffusion type configuration depending on the desired mode for introducing the hydrogen sulfide contaminated gas to the anode, as discussed below in greater detail.

Preferably, for an electrolyte fluid with a pH of less than 7, the anode can be formed from a carbon based material or a material containing carbides, nitrides or mixtures thereof, such as WC, TiC, $TiN_2$ and can include transition elements such as Co, Ni and in some instances Mo. The anode can include some traces of Pb. For an electrolyte with a pH of greater than 7, the anode can be formed of a greater variety of materials such as those described above and others such as Pb, Fe, Ru, Cu or their sulfides or oxides.

A number of different methods can be used to form a layer of catalytic material on the surface of suitable substrates Vacuum deposition techniques (i.e., sputtering, vapor deposition, plasma deposition), chemical deposition techniques and/or electrochemical deposition techniques or combinations of these techniques may be employed to deposit or form the catalytic layer of film. For example, a layer, including a transition metal, can be deposited onto the substrate and then chemically modified by soaking in a sulfide containing solution which then may be heat treated to form a sulfide or oxy sulfide of the transition metal. The catalytic material can also be deposited chemically such as to form metal sulfides. As another example, the substrate can have a layer of lead dioxide electrochemically deposited thereon and which, thereafter is at least partially converted to lead sulfide by soaking in a polysulfide solution.

In one operation, the anode of the present invention can be utilized for direct electrolysis of hydrogen sulfide. FIG. 1 illustrates in diagrammatic form one possible cell arrangement which is suitable for direct electrolysis. An electrolysis cell 10 includes a fluid tight container 12 and a cover 14 sealed thereon. A membrane 16 dividing the container 12 into an anode compartment 18 and a cathode compartment 20. The membrane 16 prevents fluid travel between compartments 18 and 20, but does allow ionic transfer therebetween. Disposed in the anode compartment 18 is a porous anode 22 which has an internal passageway 24 extending therethrough. Connected in fluid communication with the passageway 24 is an inlet conduit 26 which sealably extends through the cover 14 to a source of $H_2S$, or $H_2S$ containing fluid such as $H_2S$ contaminated natural gas, to be electrolysized.

Disposed in the cathode compartment 20 is a cathode 28 which also sealably extends through the cover 14. The cathode can be any of the conventional configurations commonly utilized for electrolysis and can be formed of conventional materials such as nickel or nickel plated mild steel. The anode 22 and cathode 28 are electrically connected to a suitable direct current power source, such as a battery 30.

An electrolytic solution is contained in each of the compartments 18 and 20 and can be, but need not be, of the same solution. The electrolyte can be alkaline or acid, but as described later in greater detail, it is noted that the pH of the anode can be used to control the reaction products formed at the anode 22 during electrolysis. Suitable basic solutions for carrying out the present invention include among many others, aqueous solutions of sodium compounds such as sodium sulfide, sodium phosphate, etc. The electrolyte is filled and refurbished as necessary through a pair of electrolyte supply lines 32 and 34.

In operation of the cell, hydrogen sulfide contaminated gas is introduced into the electrolyte through the inlet conduit 26 into the passageway 24 in the anode 22. The gas diffuses outwardly through the porous anode structure reaching a three-phase junction of gas, electrolyte and catalyst where the anode reaction takes place. In the case of the use of a flat surface electrode, (which is used herein to distinguish from gas diffusion anodes), the $H_2S$ gas is not fed internally through the anode but is directed to the outer surface of the anode. When the cell 10 contains an electrolyte of a pH of approximately 7 or less, the $H_2S$ fed to the anode 22 will react to form free sulfur, hydrogen ions and release electrons as shown below:

(1) $H_2S \rightarrow S° \downarrow + 2H^+ + 2e^-$

The sulfur is withdrawn from the anode compartment 18 at an outlet 36 in the bottom of the cell container 12.

The gas from which the $H_2S$ has been electrolytically removed passes upwardly through the electrolyte and is withdrawn in a purified form at a second outlet 38. With an electrolyte pH of 7 or less, useful hydrogen gas is evolved at the cathode and withdrawn at the outlet 38:

(2) $2H^+ + 2e^- \rightarrow H_2 \uparrow$

When the electrolyte is of a pH greater than 7.5, the cathode reaction also forms hydrogen gas, but in this case by the electrolysis of water:

(3) $2H_2O + 2e^- \rightarrow H_2 \uparrow + 2OH^-$

More importantly, the products formed at the anode 22 when an electrolyte pH of greater than 7.5 is used are different than yielded when an electrolyte with a pH of 7 or less is employed. In this instance, the hydrogen sulfide reacts in the basic solution to form bisulfide ions and hydrogen ions according to the following reaction:

(4) $H_2S \rightarrow HS^- + H^+$

The bisulfide ions are thereafter electrolytically oxidized to form free sulfur and hydrogen sulfide as follows:

(5) $2HS^- \rightarrow S° + H_2S + 2e^-$

The free sulfur in turn reacts with sodium sulfide as shown below:

(6) $S° + Na_2S \rightarrow Na_2S_2$
(7) $Na_2S + S° \rightarrow Na_2S_3$
(8) $Na_2S_3 + \eta S° \rightarrow Na_2S\eta$ where $\eta$ represents an integer between 2 and 8.

It should be noted that since the reactions forming the polysulfides are sequential in the sense that $Na_2S_2$ reacts to form $Na_2S_3$ which in turn reacts to form $Na_2S_4$, etc., the reactions can be controlled to limit the formation of the higher sulfur content polysulfides. This can be accomplished by selection of the particular anode catalysts or electrolytes utilized and by controlling electrolyte temperature.

While the anodes of the present invention are highly resistant to the effects of poisoning, some accumulation of free sulfur in the form of finely divided precipitates is likely to enter the pores of the porous anode 22 causing an increase in the anode polarization and an increase in resistance across the anode-electrolyte interface. In order to prevent or remove such deposits, a sulfur solvent/solvent vapor such as benzene or carbon disulfide can be passed through the pores of anode 22 into the electrolyte. The anode 22 is maintained by suitable heating means at a temperature which is at least as great as the boiling point of the benzene to cause it to be vaporized and boil off from the outer surfaces of the anode 22 as the vapor exits into the electrolyte. This removes any sulfur deposits from the anode 22 and inhibits further accumulation.

Any hydrogen sulfide which has been dissolved by the solvent is evolved as the solvent is vaporized and undergoes electrochemical oxidation. The free sulfur formed by this oxidation either dissolves in the electrolyte or forms a precipitate which is removed from the anode compartment 18 at the outlet 36. The solvent vapors resulting as the solvent boils off the anode rise to the top of anode compartment 18 and are withdrawn at the outlet 38 with the natural gas, or other fluid which cell 10 is being used to decontaminate. The solvent can be removed from the natural gas by condensation and thereafter recycled back into the system to remove further sulfur deposits from the anode 22. Benzene, or other suitable solvents, can also be used to purge sulfur deposits from flat surface electrodes by directing a stream of benzene at the outer surfaces of the anode which are in contact with the electrolyte. In such case, the sulfur deposits are removed by the reaction as described above in connection with removal of sulfur from a porous anode.

In another embodiment of the invention, the sulfur formed from the hydrogen sulfide decomposition is formed in a remotely located reaction column rather than in the anode compartment of the electrolytic cell to minimize the likelihood of sulfur buildup on the anode. One arrangement for such indirect electrolysis is illustrated diagrammatically in FIG. 2. The apparatus for accomplishing indirect electrolysis, silimar to that for direct electrolysis, includes a cell 10′ having a cell container 12′ with a removable cover 14′ in sealing relationship thereto. The cell container 12′ is separated by a membrane 16′ into anode and cathode compartments 18′ and 20′, respectively. Respectively disposed in compartments 18′ and 20′ are an anode 22′ and a cathode 28′. Preferably, the anode 22′ for indirect electrolysis is a non-gas diffusion or flat surface type electrode. This is because a more intricate and hence more costly gas diffusion type electrode is not an advantage in indirect electrolysis since, as discussed below, a hydrogen sulfide gas mixture is not fed to the anode as is done in direct electrolysis.

In indirect electrolysis, the anolyte preferably contains a suitable redox couple such as iodine/iodide. The $3I^-/I_3^-$ redox couple is particularly advantageous since it allows easy control of the anode reaction with, a low possibility of side reactions within a large range of pH's and is compatible with a large range of catalysts. Suitable sources of iodine ions include KI and $K_2SO_4$ solutions and other reversible couples which have a redox potential higher than the oxidation potential of $H_2S$.

In operation, current from a power source 30′ is applied across the anode 22′ and the cathode 28′ causing an anode and cathode reaction to take place. At the cathode 28′, hydrogen gas is produced in accordance with the following equation:

(9) $2H^+ + 2e^- \rightarrow H_2 \uparrow$

At the same time a reaction occurs at the anode 22′ to oxidize the redox couple as follows:

(10) $3I^- \rightarrow I_3^-$

The oxidized redox couple is then extracted from the anode compartment 18′ through an outlet 40 by a motive source, such as a pump 42. The oxidized redox couple is moved through a conduit 44 to a remotely located reaction column 46 and enters the reaction column 46 through an inlet 48 in the top of reaction column 46. The $H_2S$ contaminated fluid, such as natural gas, is introduced into the reaction column 46 at an inlet 50 located near the bottom of reaction column 46. A supply of pure $H_2S$ gas can be utilized in the reaction column 46, as can a supply of $SO_2$ gas or a mixture of the two in a contaminated fluid. Within the reaction column 46, which can be of any conventional design, the upwardly flowing $H_2S$ contaminated natural gas reacts with the oppositely flowing oxidized redox couple containing electrolyte as follows:

(11) $I_3^- + H_2S \rightarrow S° \downarrow + 2H^+ + 3I^-$

The natural gas or other such fluid, which is now in a purified form having had the $H_2S$ contaminants removed therefrom, is withdrawn from the reaction column 46 through an outlet conduit 52 connected to an outlet 54 near the top of the reaction column 46. The other end of conduit 52 can, for example, be connected to a suitable storage tank or directly to an apparatus for utilizing the decontaminated gas.

The reduced electrolyte and free sulfur formed during reaction (11) is pumped from the reaction column 46 through an outlet 56 through a conduit 58 to a filter means 60. The free sulfur is removed from the solution by the filter means 60 which also serves as a reservoir. The free sulfur is removed from the solution before it is returned to the anode compartment 18′ through a conduit 62 and inlet 64 by a pump 66. In a continuous fashion, the redox couple is once again oxidized at the anode 22′ in accordance with reaction (10) and thereafter pumped to the reaction column 46 where it can again decompose $H_2S$ as shown in reaction (11).

The remote reaction column 46, also facilitates the monitoring of the reaction. The oxidized redox couple in the conduit 44 is yellow in color, which color can be monitored to ensure that the desired reaction is taking place in the cell 10′. In a similar manner, the reduced electrolyte from the reaction column 46 can be monitored in the conduit 62. The reduced electrolyte should be clear and this ensures that the desired reaction is taking place in the reaction column 46. Any color in the electrolyte indicates that the reaction desired has not occurred to completion. This enables the reaction rate to be adjusted. If the color change is rapid and can be observed at the reactor, the current density in the electrolysis vessel can be increased to provide more of the redox couple.

Figure 3:
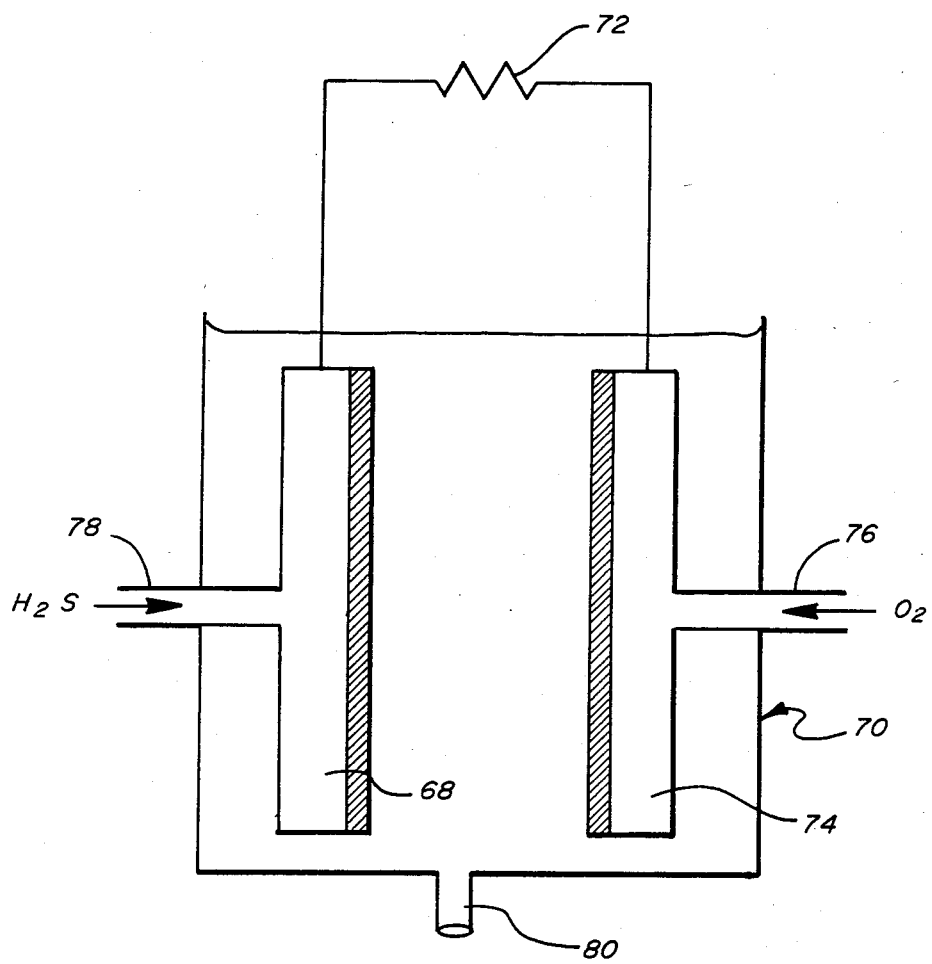
FIG. 3 is a diagrammatic view of a fuel cell for the production of electricity from hydrogen sulfide.

In operation of another embodiment, the catalytic materials of the present invention can be utilized as an anode 68 for a fuel cell 70 for producing electricity. This mode of operation can be accomplished in a substantially conventional fuel cell illustrated in FIG. 3, which for purposes of discussion, is similar to the cell 10 shown in FIG. 1. In this operation; however, a load 72 is electrically coupled across the anode 68 and a conventional cathode 74 rather than the battery 30 shown in FIG. 1. Another difference, is that in a fuel cell arrangement the cathode 74 preferably is of a gas diffusion type and an oxidant, typically oxygen or air, is fed through the cathode from an inlet 76. At the anode side of the cell 70, hydrogen sulfide is used as the fuel and is fed through the porous anode 68 from an inlet 78 to react with the electrolyte in the presence of the anode catalyst. As in electrolysis, the respective anode and cathode reactions will depend upon the pH of the electrolyte used. For an electrolyte of pH 7 or less, the reactions are:

(12) Anode: $H_2S \rightarrow S° \downarrow + 2H^+ + 2e^-$
(13) Cathode: $O_2 + 4H^+ + 4e^- \rightarrow 2H_2O$ For an electrolyte pH of greater than approximately 7.5, such as in a sodium compound alkaline electrolyte for example, the reaction will be:

Anode:
(14) $H_2S \rightarrow HS^- + H^+$
(15) $2HS^- \rightarrow S° + H_2S + 2e^-$
(16) $S° + Na_2S \rightarrow Na_2S_2$ Cathode:
(17) $O_2 + 2H_2O + 4e^- \rightarrow 4OH^-$ The electrons released in the anode reactions (12) and (15) flow from the anode 68 to the cathode 74 and can be utilized to electrically power the externally connected load 72. The sulfur or sulfur products are removed from the cell 70 at an outlet 80 in a similar manner as previously disclosed in the above discussion relating to electrolysis. Also, any sulfur accumulated on the anode 68 can be removed as described previously, i.e., by passing a solvent such as benzene through the anode at a temperature above the boiling point of the solvent.

EXAMPLE I

A sheet of Co foil was soaked in a 0.1 M NaOH and 1 M $Na_2S$ solution for approximately 12 hours, removed and annealed in argon at 500° C. for approximately one-half hour to form a surface layer of a CoS catalytic material. The electrode was tested for hydrogen sulfide decomposition in a cell utilizing a 1 M NaOH electrolyte at a temperature of 25° C. into which a hydrogen sulfide gas was continuously purged. The steady state current density at a voltage of $-0.6$ V vs. a saturated calomel electrode (SCE) was measured to be 9.6 mA/$cm^2$. The electrode performance was also determined to be stable over a period of several months indicating the catalytic material's high degree of resistance to poisoning.

EXAMPLE II

A flat surface graphite sheet was used as a substrate onto which a lead oxide surface layer was deposited electrochemically. The electrode was then soaked in a polysulfide solution to convert the lead oxide layer to a lead sulfide catalytic material. In testing, as described in connection with Example I, the steady state current at $-0.6$ V vs. the SCE electrode was measured to be 15 mA/$cm^2$.

EXAMPLE III

Tests of catalysts deposited on gas diffusion type electrodes were conducted utilizing porous disk-shaped substrates of approximately 3 $cm^2$ surface area formed from a carbon/teflon mixture supported on a nickel plated gauze. After fabrication of the substrates, a layer of catalytic material was deposited on each of the substrates by chemical or electrochemical methods. In testing the electrodes, hydrogen sulfide gas was passed through the electrode toward a half cell having a 1 M NaOH electrolyte at room temperature. In one instance the electrode included an electrochemically deposited CoS catalytic film formed from a $Co(OH)_2$ solution. During testing, this electrode provided a net current density of approximately 13 mA/$cm^2$ at a potential of $-0.6$ V vs. SCE. Another electrode having a chemically deposited CoS layer provided a net current density of approximately 10 mA/$cm^2$ at a potential of $-0.5$ V; an electrode with a catalytic film of CoS modified with Cu provided a net current density of 12 mA/$cm^2$ at $-0.5$ V; and an electrode with a CoS film modified with Cu and thereafter heat treated in air at 350° C. for one-half hour provided a net current density of approximately 7 mA/$cm^2$ at $-0.5$ V.

Figure 2:
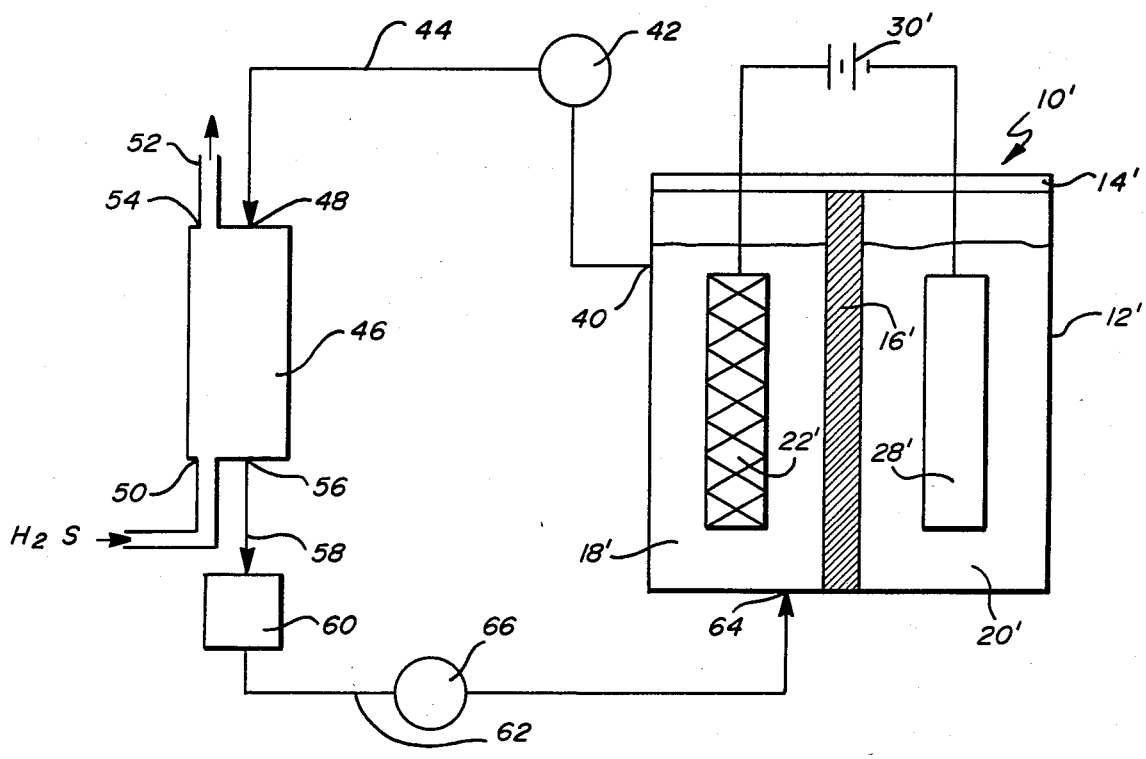
FIG. 2 is a diagrammatic view of an apparatus for indirect electrolysis of hydrogen sulfide.

Modifications and variations of the present invention are possible in light of the above teachings. For example, the conventional cathode 28, 28' and 74 can also be replaced by non-conventional cathodes as described in copending U.S. application Ser. No. 399,892 and U.S Pat. No. 4,430,391. Specifically, one conventional cathode catalyst utilized is platinum. Referring to FIG. 2, if any trace of $H_2S$ flows back into the cell 10'. the platinum containing cathode 28' will be quickly poisoned. Two further replacement cathodes are activated graphite and $PbO_2$. It is therefore, to be understood that within the scope of the appended claims, the invention can be practiced otherwise than as specifically described.

What is claimed and desired to be secured by Letters Patent of the United States is:

1. An anode for electrochemically oxidizing a sulfur containing gas, comprising:
   a multicomponent compositionally disordered catalytic material including a host matrix including at least one element selected from the group consisting of transition elements and at least one modifier element incorporated into said host matrix, said modifier element selected from the group consisting of sulfur and oxygen, said modifier element modifying the local structural and chemical environment throughout the bulk of said material to provide said disorder, said material having at least one amorphous phase, microcrystalline phase, polycrystalline phase lacking long range compositional order, or any combination of these phases.

2. The anode as defined in claim 1, wherein said host matrix element is selected from the group consisting of C, Co, Mo, Fe, Ru, Ti, W, Cu and Pb and said modifying element is incorporated to provide a sulfide, oxidize or oxy sulfide of said host matrix element.

3. The anode as defined in claim 2, wherein said anode is porous and allows diffusion of a gas therethrough.

4. The anode as defined in claim 1, wherein said anode includes a conductive substrate having an outer surface and said catalytic material is formed at least on a portion of said outer surface.

5. An anode as defined in claim 1, wherein said host matrix further includes a carbon containing composition.

6. An apparatus for electrolytically decomposing a sulfur containing gas comprsing:
   a cell having an interior space therein, said space divided by a membrane positioned in said space to form an anode compartment and a cathode compartment within said cell,
   an anolyte in said anode compartment and a catholyte in said cathode compartment;
   a cathode positioned in said cathode compartment with at least a portion in contact with said catholyte,
   an anode positioned in said anode compartment with at least a portion in contact with said anolyte,
   said anode including a multicomponent catalytic material disordered throughout the bulk of said material, said catalytic material including a host matrix which includes at least one element selected from the group consisting of transition elements and at least one modifying element incorporated in said host matrix, at least one of said modifying elements selected from the group consisting of sulfur and oxygen, said material having at least one amorphous phase, microcrystalline phase, polycrystalline phase lacking long-range compositional order, or any combination of these phases,
   an electrical power source electrically coupled to said anode and said cathode, and
   means adapted to introduce a fluid containing at least a sulfur containing gas into said anode compartment wherein said gas reacts at said anode in the presence of said catalytic material to electrochemically oxidize said sulfur containing gas to form a sulfur to thereby decompose said gas.

7. The apparatus of claim 6 wherein said fluid is a gaseous mixture which includes at least one useful gas contaminated with sulfur and said oxidation of gas removes said sulfur from said fluid to decontaminate said useful gas, and
 means for removing said uncontaminated useful gas from said anode compartment.

8. The apparatus of claim 7 wherein said host matrix is selected from the group consisting of Co, Fe, Ru, Ti, Pb, Cu, Mo and W and the incorporation of said modifier element provides a sulfide, oxide, or oxy-sulfide of said host matrix element.

9. The apparatus of claim 6 wherein said host matrix further includes a carbon containing composition.

10. An apparatus for electrolytically decomposing a sulfur containing gas comprising:
 a cell having an interior space therein, said space divided by a membrane positioned in said space to form an anode compartment and a cathode compartment within said cell,
 an anolyte in said anode compartment, said anolyte including a redox couple thed a cathode compartment within said cell,
 an anolyte in said anode compartment, said anolyte including a redox couple therein, and a catholyte in said cathode compartment,
 a cathode positioned in said cathode compartment with at least a portion in contact with said catholyte,
 an anode positioned in said anode compartment with at least a portion in contact with said anolyte,
 said anode including a multicomponent catalytic material disordered throughout the bulk of said material, said catalytic material including a host matrix which includes at least one element selected from the group consisting of transition elements and at least one modifying element incorporated in said host matrix, at least one of said modifying elements selected from the group consisting of sulfur and oxygen, said material having at least one amorphous phase, microcrystalline phase, polycrystalline phase lacking long range compositional order, or any combination of these phases;
 an electrical power source electrically coupled to said anode and said cathode, said power source when applied causing a reaction in the presence of said anode catalytic material to oxidize said redox couple,
 a reaction column having a first inlet and a first outlet fluidly coupled to said anode compartment, and a second inlet for connection to a source of sulfur contaminated fluid, and a second outlet for withdrawal of a decontaminated gas,
 motive means for transferring said oxidized redox couple to said reaction column from said anode compartment, and for transferring said redox couple from said first outlet back into said anode compartment,
 means adapted to introduce said contaminated fluid into said reaction column, said oxidized redox couple being reduced by reaction with said sulfur contaminated fluid, and oxidizing said fluid to produce sulfur and decontaminate said fluid, and
 means for filtering the sulfur from said reduced redox couple before it is returned to said anode compartment.

11. The apparatus of claim 10 wherein said host matrix is selected from the group consisting of Co, Fe, Ru, Ti, Pb, Cu, Mo and W and the incorporation of said modifier element provides a sulfide, oxide, or oxy-sulfide of said host matrix element.

12. The apparatus of claim 10 wherein said host matrix further includes a carbon containing composition.

* * * * *